T. SHAW.
Electrical Pressure Indicator.
No. 223,068.  Patented Dec. 30, 1879.
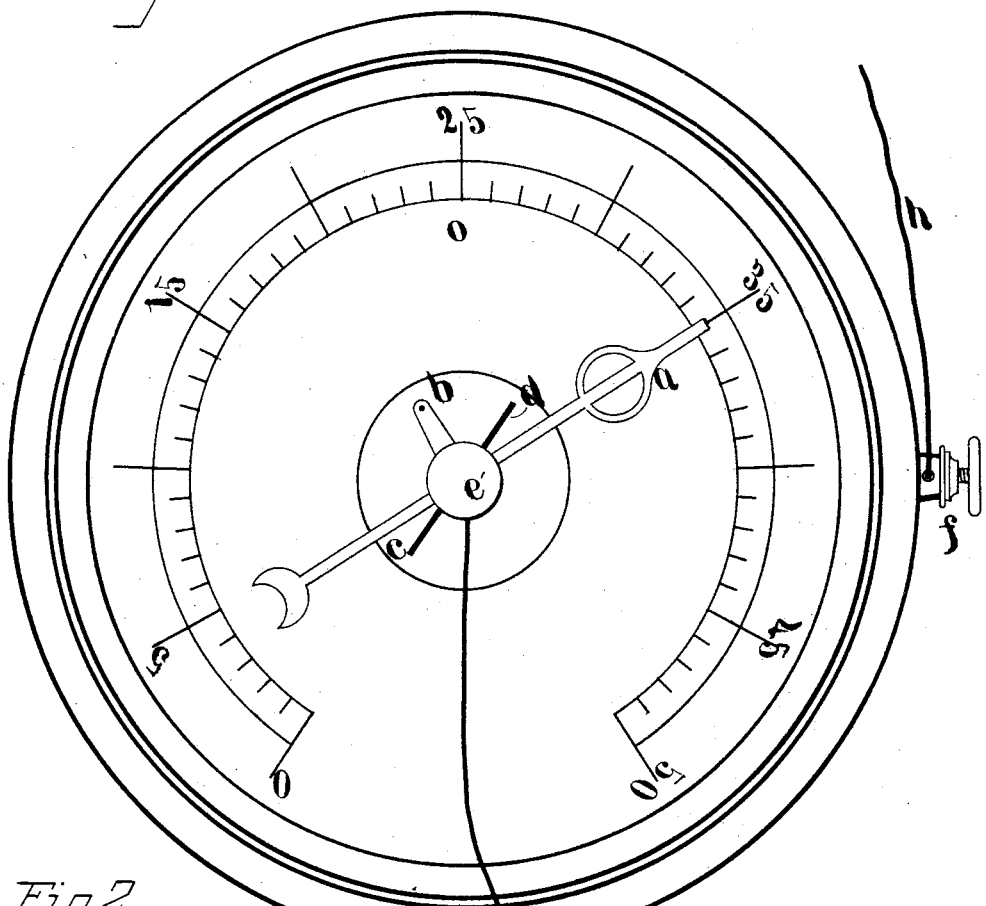
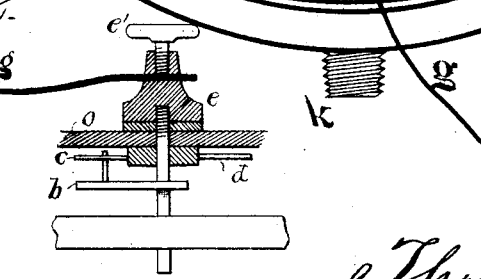
WITNESSES:
Wm Garwood
Wm B Hughes
Thos Shaw INVENTOR
ATTORNEY

UNITED STATES PATENT OFFICE.

THOMAS SHAW, OF PHILADELPHIA, PENNSYLVANIA.

IMPROVEMENT IN ELECTRICAL PRESSURE-INDICATORS.

Specification forming part of Letters Patent No. 223,068, dated December 30, 1879; application filed November 15, 1879.

*To all whom it may concern:*

Be it known that I, THOMAS SHAW, of the city and county of Philadelphia, Pennsylvania, have invented a new and Improved Electrical Pressure-Indicator for Attachment to Spring-Gages; and I hereby declare the following to be a full, clear, and exact description of the same, reference being had to the accompanying drawings, and to the letters of reference marked thereon.

My invention consists in the provision of short circuit-arms projecting from a binding-post in front face of gage, and in the provision of short circuit-arms projecting from the axis or spindle of gage, operated in the manner and for the purpose hereinafter explained.

The object of the invention is to give signal notice of any maximum pressure at which the gage may be set.

In order to enable others to use and practice my invention, I will proceed to describe its construction and operation.

On reference to the accompanying drawings, which form part of this specification, Figure 1 represents a face view of an ordinary spring-gage, of which $a$ is the hand or pointer of ordinary spring-gage, secured to the regular spindle in center of gage, and $b$ is a short metallic arm secured to hand or spindle of gage; and Fig. 2, a detached central section of the gage.

At the outer end of said arm $b$ a metallic pin projects, to come in contact with metallic arms $c$ and $d$ whenever said arm $b$ is moved on its axes far enough to touch the same.

The arms $c$ and $d$ are secured to the nut of a binding-post, $e$, located in the center of the glass front $o$ of gage. The screw securing the post to glass front passes through aperture in the glass.

The binding-post $e$, with its arms $c\,d$, is insulated from all other parts of the gage, by reason of its support being upon the glass front $o$. A wire, $g$, leads from one of the poles of an ordinary battery and connects with said post $e$.

The arm $b$, secured to the hand and spindle of gage, is in metallic contact with the metallic case of gage, and a binding-post, $f$, secured to any part of said case and connected with the other pole of the battery, will place the gage in an electrical circuit, in which circuit is located an ordinary electrical bell, or other device that will give notice whenever the current from battery is permitted to flow.

The arm $c$ is located to point at the desired minimum pressure, and the arm $d$ at the desired maximum pressure.

$k$ is the inlet to gage where it is connected to any source of pressure, and on the application of pressure to force the rotation of arm $b$, so that the projecting pin on the end of same comes in contact with arm $d$, an unbroken electric circuit will be established that will ring bell, &c., of any striker device in said circuit, and thus give prominent notice of the maximum pressure, and whenever said pressure is lowered, so as to permit pin on said arm $b$ to come in contact with arm $c$, then a similar notice will be given for the minimum pressure.

The arms $c$ and $d$ can be connected both with one post, $e$, and the same electric bell, or can be connected, if desired, by separate posts and separate bells; or one of said arms can be united when it is desired to alarm only at one point of pressure.

The ordinary glass front $o$ of gage offers a suitable support for the insulated post $e$; but said post $e$ might be located on other parts of said gage with proper insulation without alteration in the result.

It will be evident that the same device without alteration answers for spring vacuum-gages; but as vacuum-gages are actuated by air-pressure, I class this with pressure-gages.

What I claim, and desire to secure by Letters Patent, is—

1. In spring pressure-gages, the projecting arm $b$, connected with spindle of gage, in combination with insulated arms $c$ and $d$, to establish electric circuit with an electric bell or other mechanical device actuated by the electric current.

2. In spring pressure-gages, the binding-post $e$, in combination with the glass front $o$, the arms $c$ and $d$, and arm $b$, substantially as and for the purpose set forth.

THOMAS SHAW.

Witnesses:
 WM. GARWOOD,
 WM. B. HUGHES.